(12) United States Patent
Mao

(10) Patent No.: US 9,716,868 B1
(45) Date of Patent: Jul. 25, 2017

(54) COLOR FILTER INCLUDING DIAMOND-SHAPED PIXELS

(71) Applicant: OMNIVISION TECHNOLOGIES, INC., Santa Clara, CA (US)

(72) Inventor: Duli Mao, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/060,187

(22) Filed: Mar. 3, 2016

(51) Int. Cl.
*H04N 9/04* (2006.01)
*H04N 5/378* (2011.01)

(52) U.S. Cl.
CPC .............. *H04N 9/045* (2013.01); *H04N 5/378* (2013.01)

(58) Field of Classification Search
CPC ........ H04N 9/045; H04N 9/646; H04N 5/378; H04N 5/23232; H04N 5/33; H04N 5/332; H04N 5/23238; H04N 5/23296; H04N 5/3696; H04N 5/3458; H04N 5/2258; H04N 1/19589; H04N 3/1593; H04N 3/1562; H04N 3/1512; H04N 7/18; H04N 2209/045; H01L 27/14618; H01L 27/14645; H01L 27/14603; H01L 27/14621; G06T 7/55
USPC ........................................................ 348/280
See application file for complete search history.

(56) References Cited

U.S. PATENT DOCUMENTS

| | | | |
|---|---|---|---|
| 6,522,356 B1 * | 2/2003 | Watanabe | H04N 9/045 348/272 |
| 7,375,803 B1 * | 5/2008 | Bamji | G01S 7/4816 356/4.01 |
| 7,414,630 B2 * | 8/2008 | Schweng | H04N 9/045 345/589 |
| 7,821,553 B2 * | 10/2010 | Ellis-Monaghan | H04N 9/045 348/277 |
| 7,961,239 B2 | 6/2011 | Lee | |
| 8,446,470 B2 | 5/2013 | Lu et al. | |
| 8,525,915 B2 | 9/2013 | Glenn | |
| 8,599,291 B2 * | 12/2013 | Min | H04N 5/332 348/273 |
| 9,036,061 B2 * | 5/2015 | Hayashi | H04N 9/07 348/275 |
| 9,369,681 B1 * | 6/2016 | Wu | H04N 5/3696 |
| 9,425,227 B1 * | 8/2016 | Wang | H01L 27/14621 |
| 9,577,012 B2 * | 2/2017 | Ooki | H01L 27/14621 |

(Continued)

*Primary Examiner* — Pritham Prabhakher
(74) *Attorney, Agent, or Firm* — Christensen O'Connor Johnson Kindness PLLC

(57) ABSTRACT

Embodiments are described of a color filter array including a plurality of tiled minimal repeating units. Each minimal repeating unit includes a primary set of four rhombic color filters positioned so that at least two vertices of each rhombic color filter contact a vertex of an adjoining rhombic color filter and so that the four rhombic filters form a central interstitial space and four peripheral interstitial spaces, wherein the primary set includes at least one color filter with a first spectral photoresponse, at least one color filter with a second spectral photoresponse, and at least one color filter with a third spectral photoresponse. Each minimal repeating unit also includes a secondary set of rhombic filters, the secondary set comprising a rhombic filter positioned in the central interstitial space and rhombic filters positioned in three of the four peripheral interstitial spaces, wherein the rhombic filters in the secondary set have a fourth spectral photoresponse different than any of the first, second, and third spectral photoresponses.

16 Claims, 8 Drawing Sheets

(56) References Cited

U.S. PATENT DOCUMENTS

| | | | |
|---|---|---|---|
| 2007/0153104 A1* | 7/2007 | Ellis-Monaghan | H04N 9/045 348/272 |
| 2007/0257998 A1* | 11/2007 | Inoue | H04N 9/045 348/272 |
| 2011/0090382 A1* | 4/2011 | Glenn | H04N 3/1562 348/280 |
| 2015/0171146 A1* | 6/2015 | Ooki | H01L 27/14621 250/208.1 |
| 2015/0212367 A1* | 7/2015 | Wang | G02F 1/133514 349/108 |
| 2015/0228689 A1* | 8/2015 | Lenchenkov | H01L 27/14649 257/432 |
| 2016/0150165 A1* | 5/2016 | Grauer | H01L 27/14621 348/280 |
| 2016/0150199 A1* | 5/2016 | Wu | H04N 5/3696 348/279 |

* cited by examiner

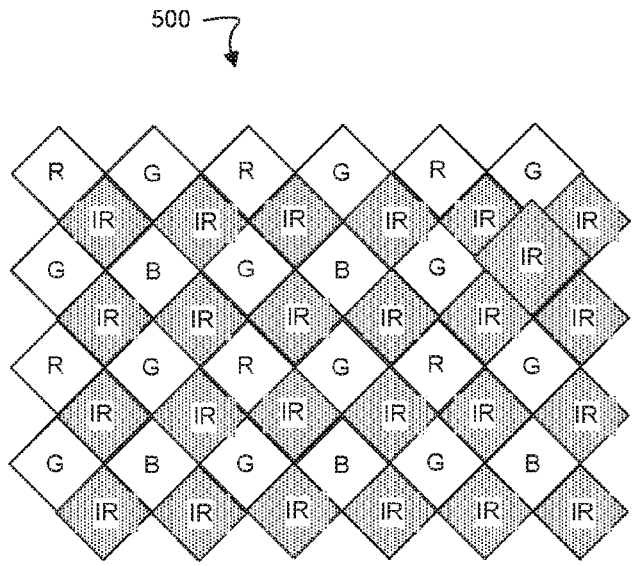
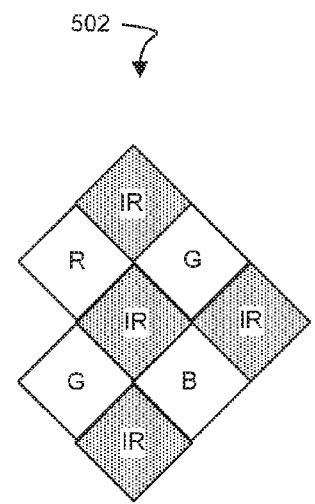
*Fig. 5A*  *Fig. 5B*
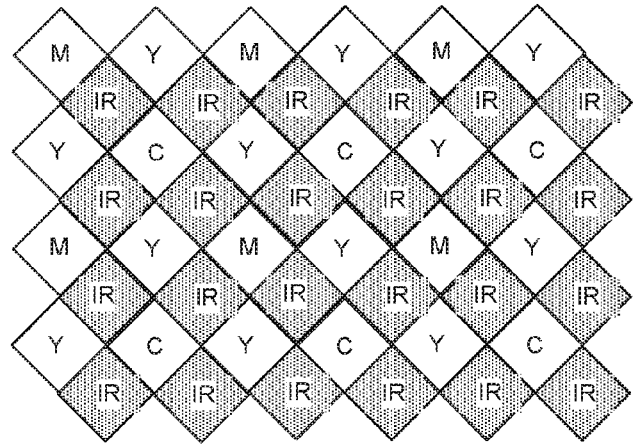
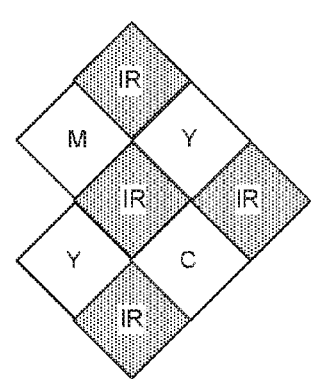
*Fig. 6A*  *Fig. 6B*

COLOR FILTER INCLUDING DIAMOND-SHAPED PIXELS

TECHNICAL FIELD

The disclosed embodiments relate generally to image sensors and in particular, but not exclusively, to image sensors including a color filter array (CFA) with diamond-shaped filters.

BACKGROUND

Image sensors are widely used in digital still cameras, cellular phones, and security cameras, as well as in medical, automobile, and other applications. The technology used to manufacture image sensors, and especially complementary metal-oxide-semiconductor ("CMOS") image sensors, has continued to advance at great pace, and the demands of higher resolution and lower power consumption have encouraged further miniaturization and integration of image sensors.

Conventional CMOS image sensors use color filter arrays (CFAs) with abutting square filters having a set of primary colors such as red, green, and blue (RGB) arranged in what is commonly known as a Bayer pattern. In some embodiments additional visible or nonvisible filters can be included in the color filter array to increase the sensitivity of the image sensor and/or provide imaging capabilities outside the visible range of wavelengths.

But the additional pixels can reduce resolution and cause color aliasing. Resolution can be reduced if non-visible filters are used because they decrease the number of visible pixels. Color aliasing results in the wrong color appearing in an area of the image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified. Figures are not drawn to scale unless specifically indicated.

FIGS. 5A-5B are diagrams of an embodiment of a color filter array and its minimal repeating unit, respectively.

FIGS. 6A-6B are diagrams of another embodiment of a color filter array and its minimal repeating unit, respectively.

DETAILED DESCRIPTION OF THE ILLUSTRATED EMBODIMENTS

Embodiments are described of an apparatus, system and method for color filter arrays using diamond-shaped pixels. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment. Appearances of "in one embodiment" or "in an embodiment" therefor do not necessarily all refer to the same embodiment. Furthermore, the particular features, structures, or characteristics may be combined in any suitable manner in one or more embodiments.

Figure 1:
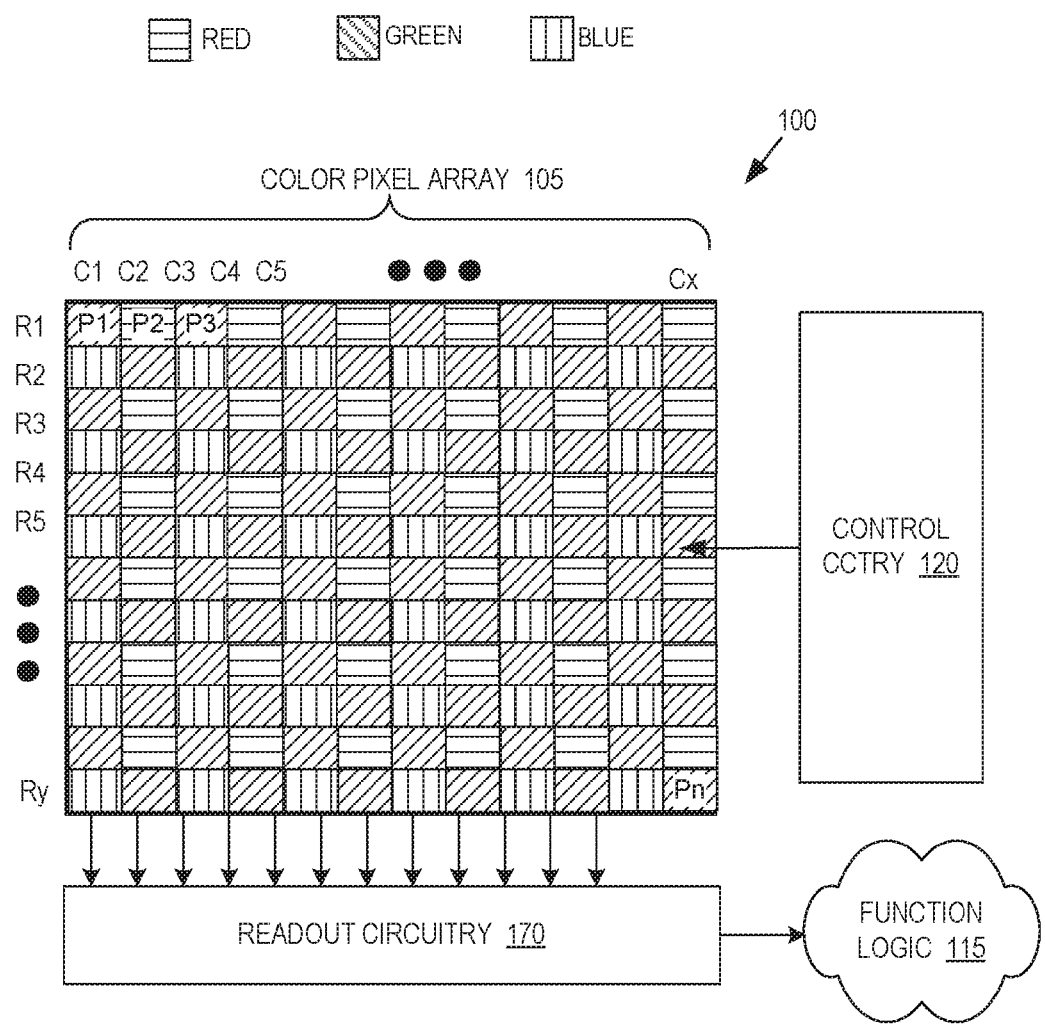
FIG. 1 is a schematic of an embodiment of an image sensor including a color filter array.
Figure 2A:
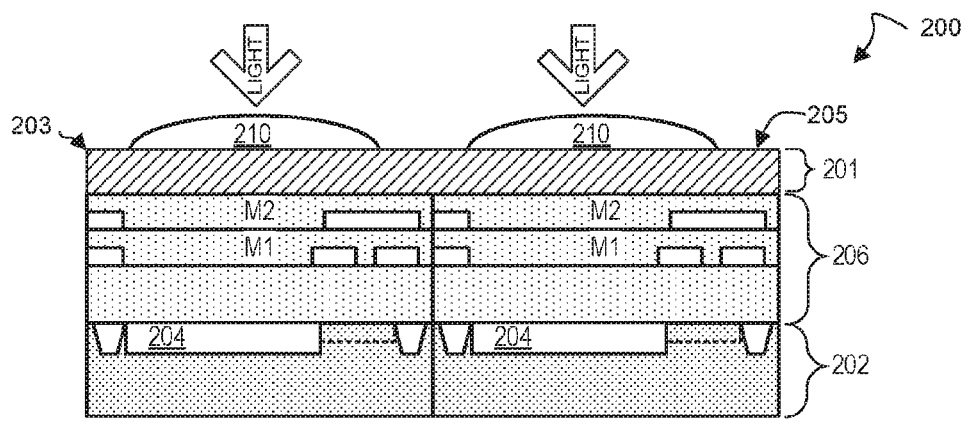
FIGS. 2A-2B are, respectively, cross-sections of embodiments of a pair of frontside-illuminated pixels and embodiments of a pair of backside-illuminated pixels.
Figure 2B:
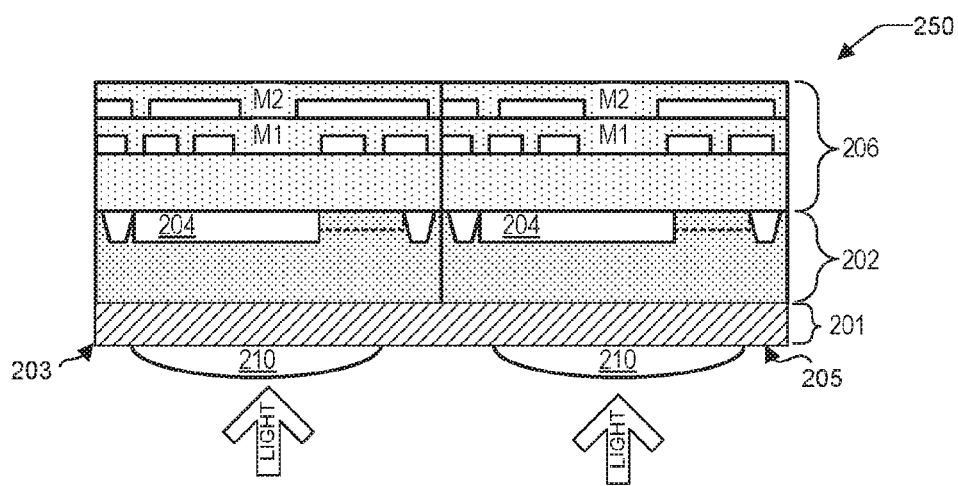

FIG. 1 illustrates an embodiment of a complementary metal oxide semiconductor (CMOS) image sensor 100 including a color pixel array 105, readout circuitry 170 coupled to the pixel array, function logic 115 coupled to the readout circuitry, and control circuitry 120 coupled to the pixel array. Color pixel array 105 is a two-dimensional ("2D") array of individual imaging sensors or pixels (e.g., pixels P1, P2 . . . , Pn) having X pixel columns and Y pixel rows. Color pixel array 105 can be implemented as a frontside-illuminated image sensor as shown in FIG. 2A, or as a backside-illuminated image sensor as shown in FIG. 2B. As illustrated, each pixel in the array is arranged into a row (e.g., rows R1 to Ry) and a column (e.g., column C1 to Cx) to acquire image data of a person, place, or object, which can then be used to render a 2D image of the person, place, or object. Color pixel array 105 assigns color to each pixel using a color filter array (CFA) coupled to the pixel array, as further discussed below in connection with the disclosed embodiments of color filter arrays. The illustrated pixel array 105 has abutting square pixels, but in embodiments with color filter arrays with rhombic filters such as the ones described below the shape and orientation of each pixel in the array will usually substantially match the shape and orientation of the filter to which it is optically coupled.

After each pixel in pixel array 105 has acquired its image data or image charge, the image data is read out by readout circuitry 170 and transferred to function logic 115 for storage, additional processing, etc. Readout circuitry 170 can include amplification circuitry, analog-to-digital ("ADC") conversion circuitry, or other circuits. Function logic 115 can store the image data and/or manipulate the image data by applying post-image effects (e.g., crop, rotate, remove red eye, adjust brightness, adjust contrast, or otherwise). Function logic 115 can also be used in one embodiment to process the image data to correct (i.e., reduce or remove) fixed pattern noise. Control circuitry 120 is coupled to pixel array 105 to control operational characteristic of color pixel array 105. For example, control circuitry 120 can generate a shutter signal for controlling image acquisition.

FIG. 2A illustrates a cross-section of an embodiment of a pair of frontside-illuminated (FSI) pixels 200 in a CMOS image sensor. The front side of FSI pixels 200 is the side of substrate 202 upon which the photosensitive area 204 and associated pixel circuitry are disposed, and over which metal stack 206 for redistributing signals is formed. Metal stack 206 includes metal layers M1 and M2, which are patterned to create an optical passage through which light incident on FSI pixels 200 can reach photosensitive or photodiode ("PD") regions 204. To implement a color image sensor, the front side can include a color filter array 201 with each of its color filters (only two individual filters 203 and 205 are illustrated in this particular cross section) disposed under a microlens 210 that can focus incident light onto PD region 204. Color filter array 201 can be a color filter array formed with any of the minimal repeating units discussed herein.

FIG. 2B illustrates a cross-section of an embodiment of a pair of backside-illuminated (BSI) pixels 250 in a CMOS image sensor. As in FSI pixels 200, the front side of pixels 250 is the side of substrate 202 upon which the photosensitive regions 204 and associated pixel circuitry are disposed, and over which metal stack 206 is formed for redistributing signals. The backside is the side of substrate 202 opposite the front side. To implement a color image sensor, the backside can include color filter array 201, with each of its individual filters (individual filters 203 and 205 are illustrated in this particular cross section) disposed under a microlens 210. Color filter array 201 can be a color filter array formed with any of the minimal repeating units discussed herein. Microlenses 206 aid in focusing incident light onto photosensitive regions 204. Backside illumination of pixels 250 means that the metal interconnect lines in metal stack 206 do not obscure the path between the object being imaged and the photosensitive regions 204, resulting in greater signal generation by photosensitive regions 204.

Figure 3:
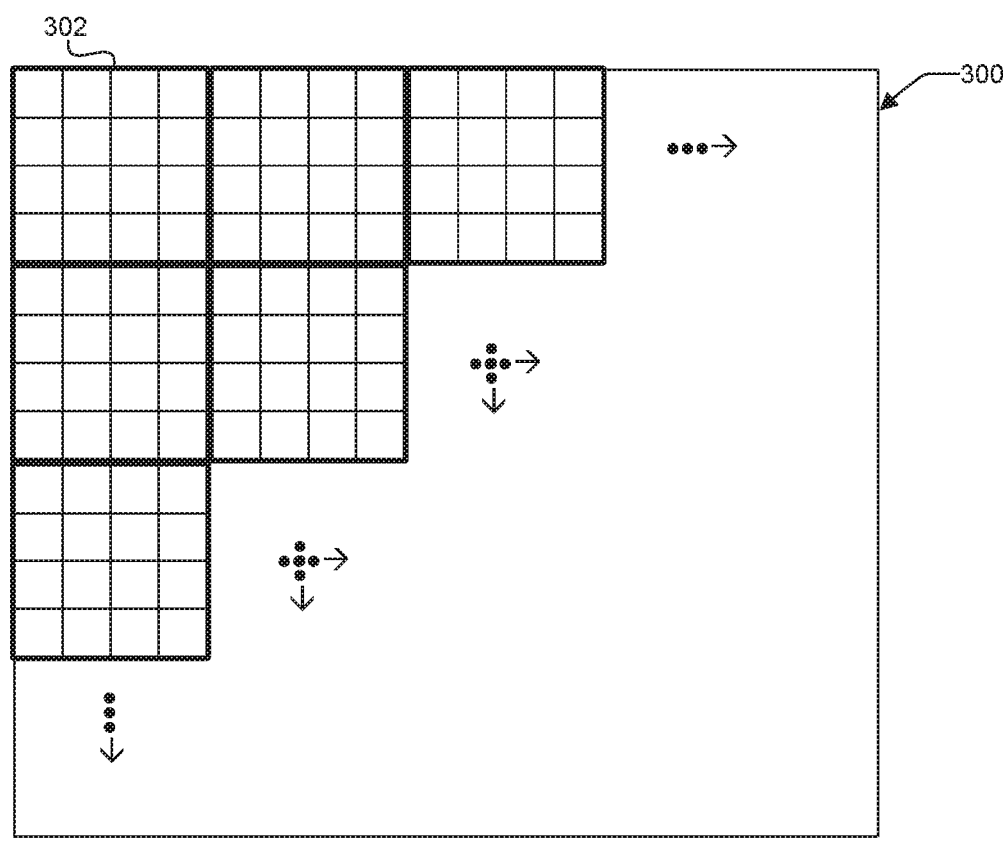
FIG. 3 is a diagram of an embodiment of a color filter array (CFA) formed by tiling multiple minimal repeating units (MRUs).

FIG. 3 illustrates a color filter array (CFA) 300 and a set of minimal repeating units (MRUs) that are tiled to form the CFA. CFA 300 includes a number of individual filters that substantially corresponds to the number of individual pixels in the pixel array to which CFA 300 is or will be optically coupled. Each individual filter is optically coupled to a corresponding individual pixel in the pixel array and has a particular color photoresponse selected from a set of photoresponses. A particular photoresponse has high sensitivity to certain portions of the electromagnetic spectrum while simultaneously having low sensitivity to other portions of the spectrum. Pixels themselves are not colored, but because CFAs assign a separate photoresponse to each pixel by placing a filter over the pixel, it is common to refer to a pixel as a pixel of the particular photoresponse to which it is optically coupled. Hence a pixel can be referred to as a "clear pixel" if it has no filter or is optically coupled to a clear (i.e., colorless or panchromatic) filter, as a "blue pixel" if it is optically coupled to a blue filter, as a "green pixel" if it is optically coupled to a green filter, or as a "red pixel" if it is optically coupled to a red filter, and so on.

The individual filters in CFA 300 are grouped into minimal repeating units (MRUs) such as MRU 302, and MRUs 302 are tiled vertically and horizontally, as indicated by the arrows, to form CFA 300. A minimal repeating unit is a repeating unit such that no other repeating unit has fewer individual filters. A color filter array can include several different repeating units, but a repeating unit is not a minimal repeating unit if there is another repeating unit in the array with fewer individual filters. Other embodiments can also include a filter array with an MRU that includes a greater or lesser number of pixels than illustrated for MRU 302 (see, e.g., FIGS. 4D, 5B, 6B, and 7B).

FIGS. 4A-4D together illustrate an embodiment of a minimal repeating unit (MRU) 400 and its primary and secondary filter sets. Directional terminology—North, South, East, West, top, bottom, left, right, above, below, etc.—is used to refer to the orientations relative to the page of individual filters, groups of filters, and filter patterns shown in these figures. This directional terminology is used to help describe what is shown, but does not refer to any orientation that a filter pattern, alone or in combination with another device such as an image sensor, might have in actual use. Moreover, the terms "primary" and "secondary" are used in respect of the filters and filter sets that comprise embodiments of MRU 400, but these terms do not mean or imply that one filter set is more important than the other, only that they are different from each other.

Figure 4A:
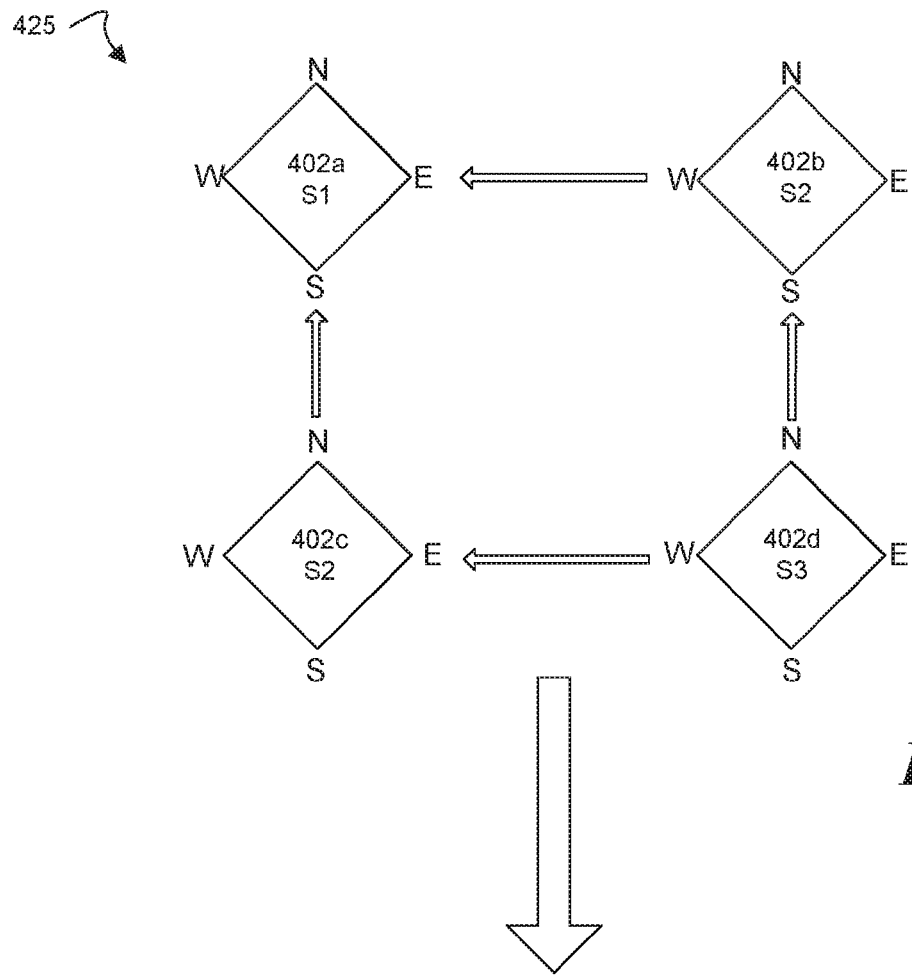
FIGS. 4A-4D are diagrams of an embodiment of a minimal repeating unit and its components.
Figure 4B:
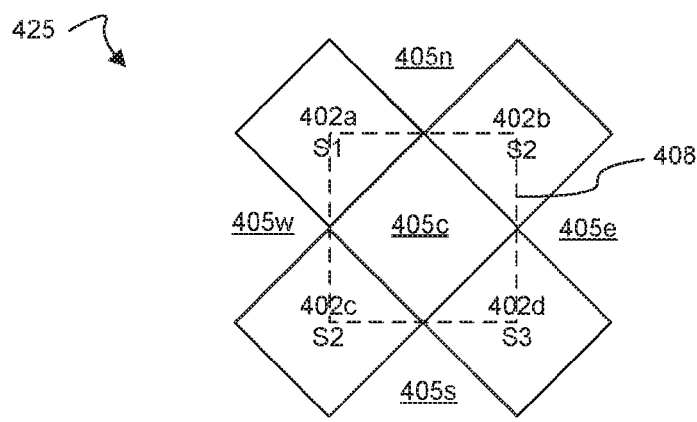

FIGS. 4A-4B together illustrate the construction of a primary filter set 425. Primary filter set 425 includes four quadrilateral rhombic filters 402a-402d. Rhombic means that the filters are diamond-shaped or, put differently, have the shape of a rhombus. A rhombus is a simple (i.e., non-self-intersecting) quadrilateral in which all four sides have the same length; the diagonals are perpendicular and bisect each other; and each diagonal bisects two opposite interior angles. Although the illustrated filters 402a-402d are squares (they have been rotated 45 degrees), they are still rhombuses because a square is a special case of a rhombus (see, e.g., FIG. 7A-7B for the more general case of a rhombus that isn't a square). In the illustrated embodiment filters 402a-402d are rhombic and of substantially the same size, but in other embodiments filters 402a-402d need not have the same size.

Each rhombic filter 402 has four vertices—in the figure these are labeled N, S, E, and W for each filter, corresponding to North, South, East, and West for the orientation of the vertices of each filter relative to the page. To form primary filter set 425, filters 402a-402d are brought together so that each rhombic filter 402 has two of its vertices in contact with the vertex of another rhombic filter. This is true of primary filter set 425 and of MRU 400 viewed in isolation. But when multiple MRUs 400 are tiled into a complete filter array every filter except filters at the edges of the array will actually have all four vertices in contact with the vertex of another filter (see, e.g., FIGS. 5A-5B, 6A-6B).

In the illustrated embodiment filter 402a has its vertex E positioned coincident with vertex W of filter 402b and its vertex S coincident with vertex N of filter 402c. Filter 402b has its vertex W positioned coincident with vertex E of filter 402a and its vertex S coincident with vertex N of filter 402d. Filter 402c has its vertex E positioned coincident with vertex W of filter 402d and its vertex N coincident with vertex S of filter 402a. Filter 402d has its vertex W positioned coincident with vertex E of filter 402c and its vertex N coincident with vertex S of filter 402b.

For assignment of spectral photoresponses to the individual filters in MRU 400, the individual filters can be divided into two groups: filters in the primary set, which have three different color spectral photoresponses S1, S2, and S3; and a filters in the secondary set, which have a fourth photoresponse S4 that is different than S1, S2, or S3. In primary set 425, and hence MRU 400, three spectral photoresponses S1-S3 are assigned to four filters 402a-402d, meaning that any of photoresponses S1-S3 can appear twice in primary filter set 425 and MRU 400; in other words, same-color-photoresponse filters can appear more than once in the MRU. In the illustrated embodiment of primary filter set 425 spectral photoresponse S2 appears twice and is positioned so that the same-color-photoresponse filters are diagonally opposed and non-abutting; this arrangement is an application of the well-known Bayer pattern to rhombic pixels. But in other embodiments same-color-photoresponse filters can be positioned differently than shown. For example the same-photoresponse filters can be positioned along a different diagonal, or can abut horizontally or vertically.

The set of color photoresponses selected for use in an MRU usually has at least three colors, but in some embodiments can include four or more. In an embodiment of MRU 400 with four color photoresponses, the set of photoresponses S1-S4 can be red, green, blue, and clear or panchromatic (i.e., neutral or colorless). But in other embodiments CFA 300 can include other photoresponses in addition to, or instead of, those listed. For instance, other embodiments can include visible photoresponse filters such as cyan (C), magenta (M), yellow (Y), and clear (i.e., colorless) filters. Still other embodiments can include filters with nonvisible photoresponses such as infrared filters, ultraviolet filters, x-ray filters, etc.

As used herein, a white, clear, colorless, or panchromatic photoresponse refers to a photoresponse having a broader spectral sensitivity than those spectral sensitivities represented in a set of color photoresponses. A panchromatic photosensitivity can have high sensitivity across the entire visible spectrum. The term panchromatic pixel will refer to a pixel having a panchromatic photoresponse. Although the panchromatic pixels generally have a broader spectral sensitivity than the set of color photoresponses, each panchromatic pixel can have an associated filter. Such filter is either a neutral density filter or a color filter.

FIG. 4B illustrates an embodiment of primary set 425 that results from putting rhombic filters 402a-402d together as shown in FIG. 4A. When brought together as shown, filters 402a-402d form a central interstitial space 405c and four peripheral interstitial spaces 405n, 405s, 405e, and 405w. Central interstitial space 405c is a closed space, meaning it is completely bounded by four edges: edge SE of filter 402a, edge SW of filter 402b, edge NE of filter 402c and edge NW of filter 402d. In primary set 425, peripheral interstitial spaces 405n, 405s, 405e, and 405w are open spaces in the sense that they are bounded only on two sides. Space 405n is bounded by edge NE of filter 402a and edge NW of filter 402b; space 405s is bounded by edge SE of filter 402c and edge NW of filter 402d; space 405e is bounded by edge SE of filter 402b and edge NE of filter 402; and space 405w is bounded by edge SW of filter 402a and edge NW of filter 402c.

The result is a primary set 425 in which each rhombic filter 402a-402d has vertices in contact with two other rhombic filters and in which the four rhombic filters have their centers positioned at the vertices of quadrilateral 408. In an embodiment in which filters 402a-402d are squares, as shown in the figure, quadrilateral 408 will also be square. But if filters 402a-402d are more general rhombuses (see FIGS. 7A-7B), then quadrilateral 408 will be a rectangle.

Figure 4C:
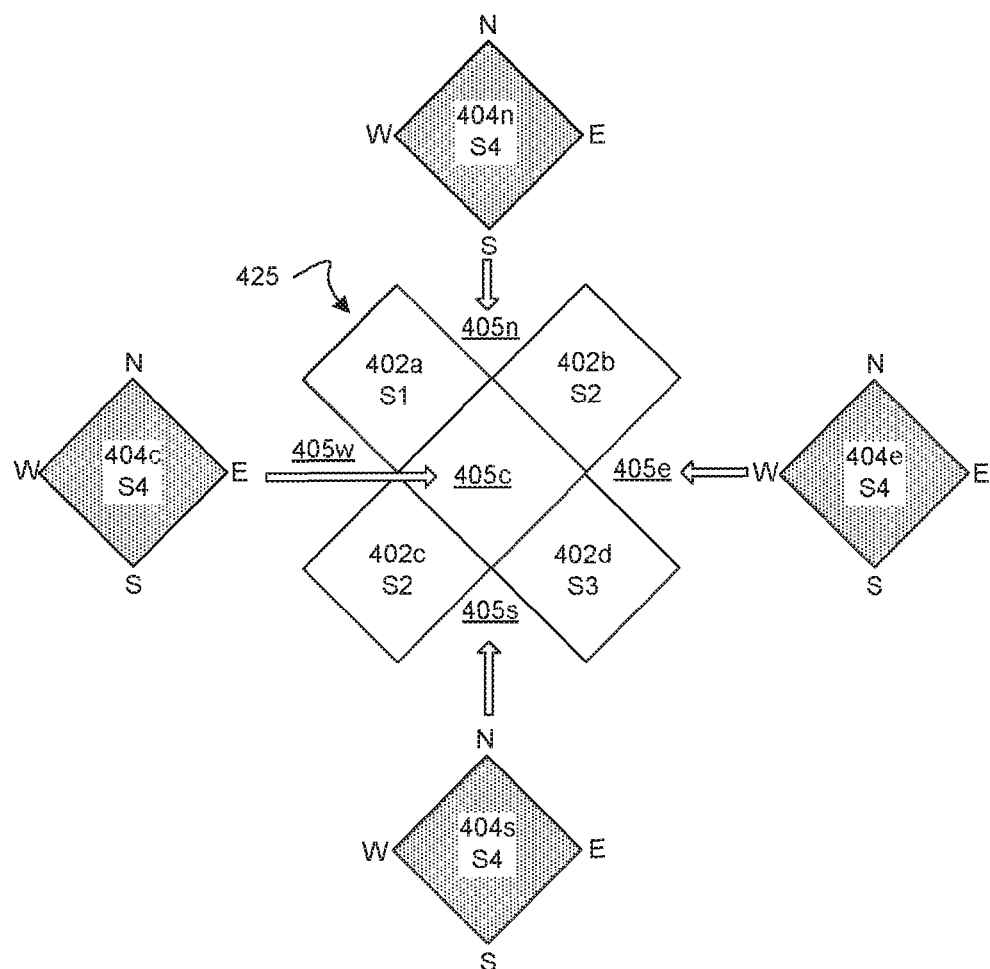
Figure 4D:
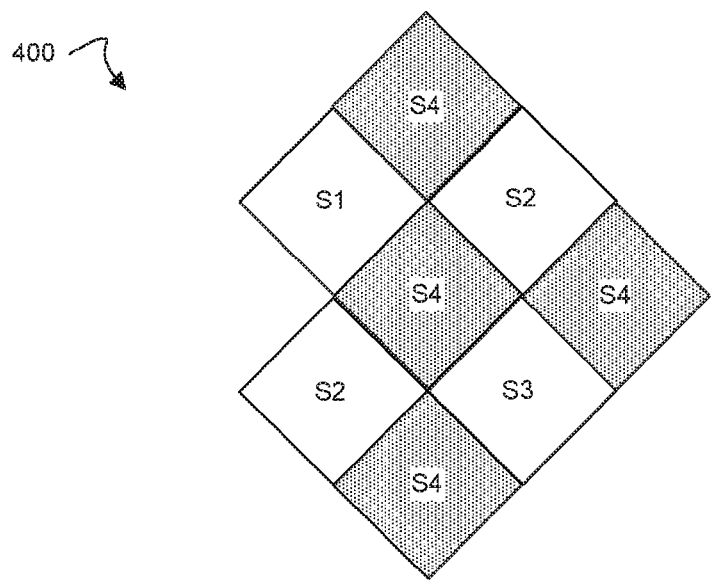

FIG. 4C illustrates the addition of a secondary set of filters to primary set 425. The secondary set includes four filters 404 that have a fourth spectral photoresponse S4 that is different than any of spectral photoresponses S1, S2, and S3 in the primary set. In one embodiment, S4 is a non-visible photoresponse such as infrared, ultraviolet, or X-ray, but in other embodiments S4 can be a visible photoresponse such as panchromatic. Four secondary-set filters 404 are positioned in primary set 425: one in center interstitial space 405c and one each in any three of the four peripheral interstitial spaces 405n, 405s, 405e, and 405w. In the illustrated embodiment of MRU 400 filter 404c is positioned in central interstitial space 405c, such that the centers of filters 402a-402d and the center of filter 404c form a quincunx. Filter 404n is positioned in peripheral interstitial space 405n, filter 404e in peripheral interstitial space 405e, and filter 404s in peripheral interstitial space 405s. But as noted above, different embodiments of MRU 400 can use any three of the four peripheral interstitial spaces. FIG. 4D illustrates an embodiment of MRU 400 that results from the components illustrated in FIGS. 4A-4C.

FIGS. 5A-5B illustrate embodiments of a color filter array 500 and its MRU 502. MRU 502 is similar to MRU 400 but with specific assignments of spectral photoresponses S1-S4. FIG. 5B illustrates an embodiment of MRU 502 in which spectral photoresponses S1-S3 are selected from a primary color set that includes red (R), green (G), and blue (B), also known as the RGB color set. In the illustrated embodiment S1 is red, S2 is green, and S3 is blue, so that the primary set forms a Bayer pattern. Spectral photoresponse S4 is a non-visible photoresponse that is infrared (IR) in the illustrated embodiment but can be another invisible photoresponse such as ultraviolet or X-ray in another embodiment. In still other embodiments, spectral photoresponse S4 can be a visible photoresponse different than S1, S2, and S3—a panchromatic photoresponse, for instance.

Color filter array such as CFA 500 maintain a true RGB Bayer pattern and produce no color fidelity or aliasing complications. There is no need for special 4×4 or 8×8 patterns or complicated interpolation algorithms, and CFA 500 can provide full-resolution or near-full-resolution color imaging as well as full-resolution or near-full-resolution infrared imaging. The full-resolution or near-full-resolution infrared imaging can be important in biometric applications such as iris recognition.

FIGS. 6A-6B illustrate other embodiments of a color filter array 600 and its MRU 602. MRU 602 is similar to MRU 400 but with specific assignments of spectral photoresponses. FIG. 6B illustrates an embodiment of MRU 600 in which spectral photoresponses S1-S3 are selected from a primary color set that includes magenta (M), yellow (Y), and cyan (C), also known as the CMY color set. In the illustrated embodiment S1 is magenta, S2 is yellow, and S3 is cyan so that the primary filter set is a CMY equivalent of a Bayer pattern. Spectral photoresponse S4 is a non-visible photoresponse that is infrared (IR) in the illustrated embodiment but can be another invisible photoresponse such as ultraviolet or X-ray in another embodiment. In still other embodiments, spectral photoresponse S4 can be a visible photoresponse different than S1, S2, and S3—a panchromatic photoresponse, for instance.

Figure 7A:
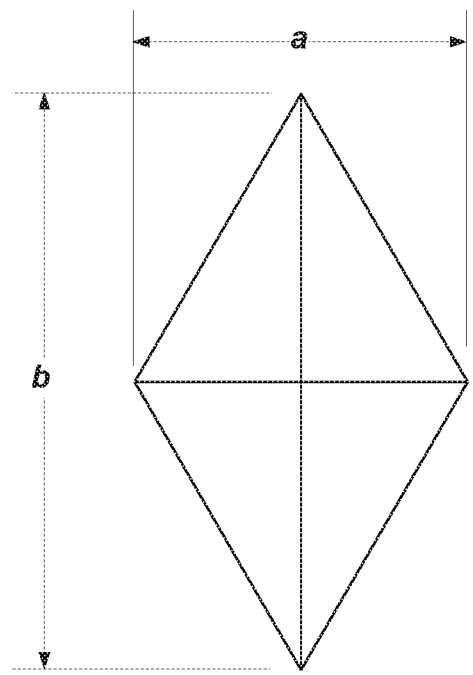
FIGS. 7A-7B are diagrams of a rhombus and an embodiment of an MRU formed using non-square rhombic filters.
Figure 7B:
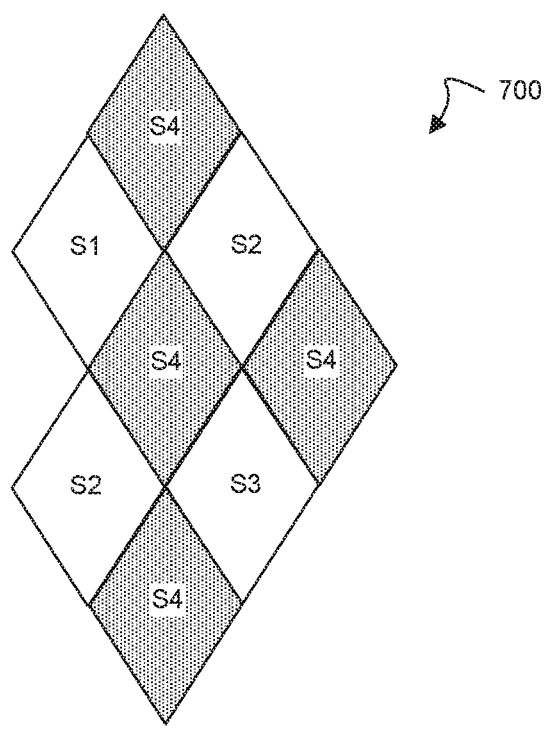

FIGS. 7A-7B illustrate an embodiment of an MRU 700 having a more general rhombic shape. FIG. 7A illustrates an embodiment of a rhombus. As mentioned above, a rhombus is a simple (i.e., non-self-intersecting) quadrilateral in which all four sides have the same length; the diagonals are perpendicular and bisect each other; and each diagonal bisects two opposite interior angles. The illustrated rhombus has a short diagonal of length a and long diagonal of length b. For a general rhombus a≠b, but for the special case where a=b the rhombus becomes a square such as the ones shown above for FIGS. 4A-4D, 5A-5B, and 6A-6B. FIG. 7B illustrates an embodiment of an MRU 700 in which the rhombic filters are rhombuses in which a≠b. MRU 700 is similar in most respects to MRU 400; the primary difference is in the shape of the rhombic filters.

Figure 8:
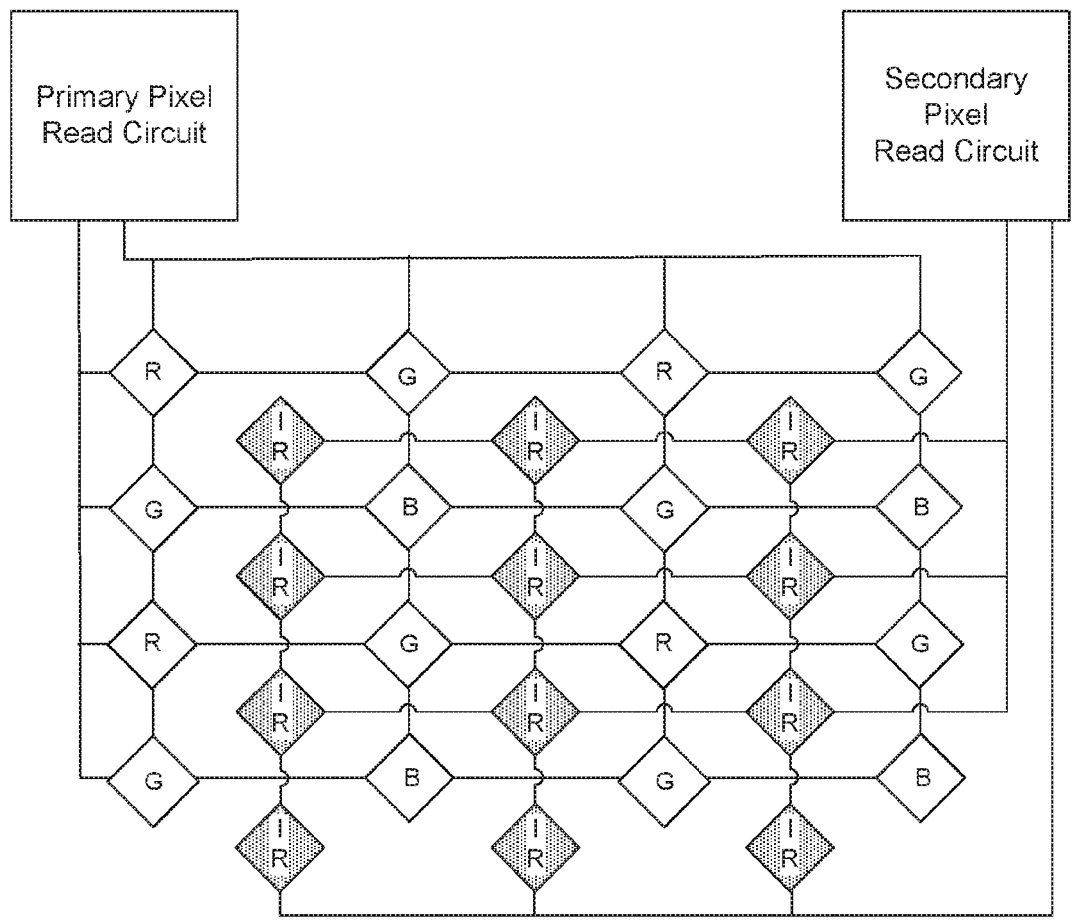
FIG. 8 is a diagram illustrating an embodiment of a pair of read circuits used to read the pixels in an image sensor having an embodiment of a described filter array.

FIG. 8 schematically illustrates an embodiment of reading circuits in an image sensor using a filter array such as the one shown in FIG. 5A. FIG. 8 shows individual filters separated from each other to make room for drawing the circuit lines, but in a real embodiment the filters would be arranged as shown in FIG. 5A with the circuit lines routed underneath or above the filters (see, e.g., FIGS. 2A-2B).

In some embodiments it can be useful to capture images using only the primary filter set or only the secondary filter set, but not both. For instance, it can be useful to capture a color image but not an IR image, and in such cases it would be a waste of time and processing resources to read pixels optically coupled to IR filters. Similarly, it can be useful to capture an IR image but not a color image, and in such cases it would be desirable to only read pixels coupled to IR filters without wasting time and processing resources reading pixels optically coupled to color filters.

For such applications, FIG. 8 provides an arrangement in which each pixel optically coupled to a filter in the primary filter set—the RGB color filters in this embodiment—is coupled to a row line and a bit line and the row lines and bit lines from the primary filter set pixels are coupled to a primary read circuit. Pixels optically coupled to filters from the secondary filter set—filters with an IR photoresponse in this embodiment—are also each coupled to a row line and a bit line, but the row lines and bit lines for the secondary set are completely separate and independent from those of the primary set. The row lines and bit lines from the secondary filter set pixels are coupled to a secondary read circuit. This arrangement of row lines, bit lines, and read circuits allows pixels that are optically coupled to filters from the primary filter set to be read separately and independently from pixels optically coupled to filters from the secondary filter set. In the illustrated embodiment the primary and secondary read circuits are shown as separate circuits, but in other embodiments they could be the same circuit but controlled by different logic.

The above description of embodiments, including what is described in the abstract, is not intended to be exhaustive or to limit the invention to the described forms. Specific embodiments of, and examples for, the invention are described herein for illustrative purposes, but various equivalent modifications are possible within the scope of the invention in light of the above detailed description, as those skilled in the relevant art will recognize.

The terms used in the following claims should not be interpreted to limit the invention to the specific embodiments disclosed in the specification and the claims. Rather, the scope of the invention is to be determined entirely by the following claims, which are to be interpreted using established claim interpretation doctrines.

The invention claimed is:

1. A color filter array comprising:
    a plurality of tiled minimal repeating units, each minimal repeating unit including at least:
        a primary set of four rhombic color filters positioned so that at least two vertices of each rhombic color filter contact a vertex of an adjoining rhombic color filter and so that the four rhombic filters form a central interstitial space and four peripheral interstitial spaces, wherein the primary set includes at least one color filter with a first spectral photoresponse, at least one color filter with a second spectral photoresponse, and at least one color filter with a third spectral photoresponse; and
        a secondary set of rhombic filters, the secondary set comprising a rhombic filter positioned in the central interstitial space and rhombic filters positioned in three of the four peripheral interstitial spaces, wherein the rhombic filters in the secondary set have a fourth spectral photoresponse different than any of the first, second, and third spectral photoresponses.

2. The color filter array of claim 1 wherein the first spectral photoresponse is red (R), the second spectral photoresponse is green (G), the third spectral photoresponse is blue (B), and the fourth spectral photoresponse is a nonvisible photoresponse.

3. The color filter array of claim 2 wherein the non-visible photoresponse is infrared (IR), ultraviolet, or X-ray.

4. The color filter array of claim 1 wherein the first photoresponse is cyan (C), the second photoresponse is yellow (Y), the third photoresponse is magenta (M), and the fourth photoresponse is a nonvisible photoresponse.

5. The color filter array of claim 4 wherein the non-visible photoresponse is infrared (IR), ultraviolet, or X-ray.

6. The color filter array of claim 1 wherein rhombic filters from the secondary set are positioned in a north peripheral interstitial space, a south peripheral interstitial space, and at least one of an east peripheral interstitial space and a west peripheral interstitial space.

7. The color filter array of claim 6 wherein rhombic filters from the secondary set are positioned in a north peripheral interstitial space, a south peripheral interstitial space, and an east peripheral interstitial space.

8. An image sensor comprising:
    a pixel array including a plurality of individual pixels;
    a color filter array positioned over the pixel array such that each individual pixel in the pixel array is optically coupled to a corresponding filter of the color filter array, the color filter array comprising a plurality of tiled minimal repeating units, each minimal repeating unit including at least:
        a primary set of four rhombic color filters positioned so that at least two vertices of each rhombic color filter contact a vertex of an adjoining rhombic color filter and so that the four rhombic filters form a central interstitial space and four peripheral interstitial spaces, wherein the primary set includes at least one color filter with a first spectral photoresponse, at least one color filter with a second spectral photoresponse, and at least one color filter with a third spectral photoresponse; and
        a secondary set of rhombic filters, the secondary set comprising a rhombic filter positioned in the central interstitial space and filters positioned in at least three of the four peripheral interstitial spaces, wherein the rhombic filters in the secondary set have a fourth spectral photoresponse different than any of the first, second, and third spectral photoresponses;
    readout circuitry coupled to the pixel array to read out signals from the individual pixels; and
    function logic coupled to the readout circuitry to process the signals read from the individual pixels.

9. The image sensor of claim 8 wherein the first spectral photoresponse is red (R), the second spectral photoresponse is green (G), the third spectral photoresponse is blue (B), and the fourth spectral photoresponse is a non-visible photoresponse.

10. The color filter array of claim 9 wherein the non-visible photoresponse is infrared (IR), ultraviolet, or X-ray.

11. The image sensor of claim 8 wherein the first photoresponse is cyan (C), the second photoresponse is yellow (Y), the third photoresponse is magenta (M), and the fourth photoresponse is a non-visible photoresponse.

12. The image sensor of claim 11 wherein the non-visible photoresponse is infrared (IR), ultraviolet, or X-ray.

13. The image sensor of claim 8 wherein rhombic filters from the secondary set are positioned in a north peripheral interstitial space, a south peripheral interstitial space, and at least one of an east peripheral interstitial space and a west peripheral interstitial space.

14. The image sensor of claim 13 wherein rhombic filters from the secondary set are positioned in a north peripheral interstitial space, a south peripheral interstitial space, and an east peripheral interstitial space.

15. The image sensor of claim 8 wherein the shape of each filter substantially matches the size of its corresponding pixel.

16. The image sensor of claim 8 wherein the readout circuitry comprises:
- a first readout circuit coupled to pixels that are optically coupled to filters from the primary set; and
- a second readout circuit coupled to pixels that are optically coupled to filters from the secondary set;
- wherein pixels that are optically coupled to filters from the primary set can be read separately and independently from pixels that are optically coupled to filters from the secondary set.

* * * * *